United States Patent [19]

Murphy

[11] Patent Number: 4,513,825
[45] Date of Patent: Apr. 30, 1985

[54] HORSESHOE FULL PAD

[76] Inventor: William Murphy, 19 Sherman Ave., Exeter, N.H. 03833

[21] Appl. No.: 573,063

[22] Filed: Jan. 23, 1984

[51] Int. Cl.³ .............................................. A01L 7/02
[52] U.S. Cl. ...................................... 168/12; 168/28; 168/26
[58] Field of Search ......................... 168/12, 26, 27, 28

[56] References Cited

U.S. PATENT DOCUMENTS

| | | | |
|---|---|---|---|
| 706,768 | 8/1902 | Marcley | 168/28 |
| 710,999 | 10/1902 | Powers | 168/26 |
| 903,043 | 11/1908 | Barber | 168/28 |
| 1,198,927 | 9/1916 | Kempshall | 168/26 |
| 1,478,874 | 12/1923 | Law | 168/28 |
| 2,191,834 | 2/1940 | Slack | 168/28 |
| 3,469,631 | 9/1969 | Becker | 168/DIG. 1 |

FOREIGN PATENT DOCUMENTS 605449  3/1926  France ................................. 168/28

OTHER PUBLICATIONS

O. R. Adams, *Lameness in Horses,* Third Edition, Lea & Febiger: Philadelphia, 1974, pp. 365–367.
"Shoeing of Standardbreds the Past Fifty Years," *Hoof Beats,* Mar. 1983, p. 184.

*Primary Examiner*—Robert P. Swiatek
*Attorney, Agent, or Firm*—Lee A. Strimbeck

[57] ABSTRACT

A horseshoe full pad to be interposed between a metal horseshoe and the hoof is made of an energy absorbing microcellular urethane foam having a tough outer skin. The pad is characterized by having a central layer or sheet which covers and can be trimmed to the hoof. Stabilizer bars and heel shock reducers are molded into the turf side of the pad and rise to about the level of the horseshoe so that they along with the shoe take up and absorb some of the shock. A frog pad may be molded into the hoof side of the pad to further protect and/or stimulate it.

8 Claims, 3 Drawing Figures

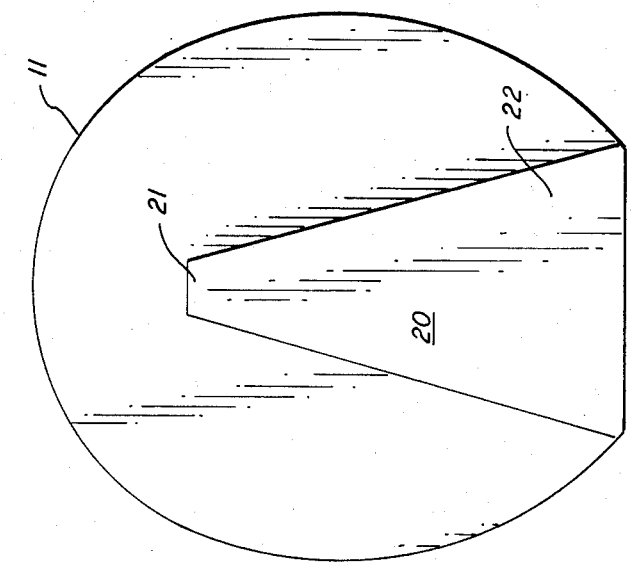
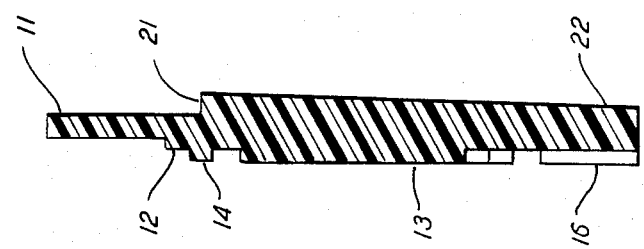
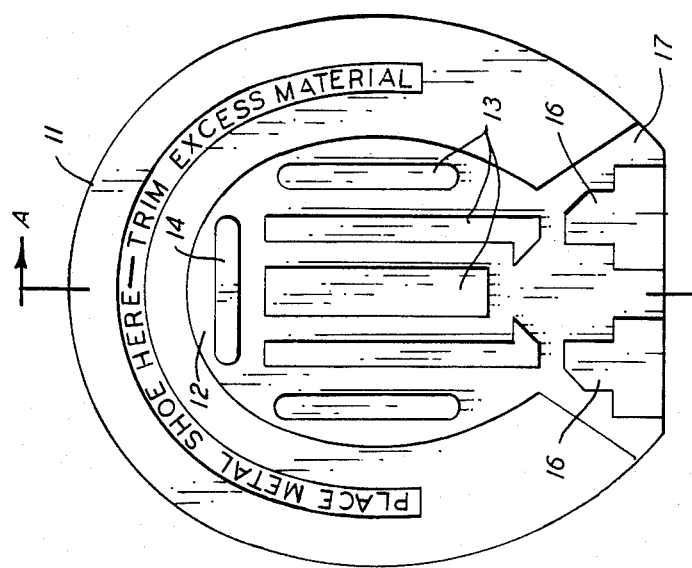

HORSESHOE FULL PAD

This invention is a horseshoe full pad of an energy absorbing resilient molded plastic composition. The pad is to be interposed between a conventional metal horseshoe and a horse's hoof. It is particularly useful to provide relief from concussion while an injury to a horse heals and to prevent injury to healthy horses.

PRIOR ART

A pre-examination search reported the following U.S. patents:
U.S. Pat. No. 3,469,631—1969—Becker
U.S. Pat. No. 3,486,561—1969—Kulak
U.S. Pat. No. 3,494,422—1970—Clark
U.S. Pat. No. 4,287,307—1981—Hostettler The first three patents are concerned with horseshoes or covers and are not directed to shock absorbing pads. The Hostettler patent is of interest as it sets out useful polyurethane foam compositions that may be used in the practice of the present invention.

See also "Lameness in Horses", O. R. Adams, 3rd Edition, Lea & Febiger, Philadelphia, PA (1974); "Shoeing of Standardbreds in the Past Fifty Years", Hoof Beats (March 1983), page 184 (copies enclosed).

THIS INVENTION

In brief compass, this invention is a horseshoe full pad of a molded foamed plastic composition having a tough outer skin and a more resilient energy absorbing lower density core. As made the full pad has generally the shape of the bottom of a hoof and is adapted to being trimmed to the hoof. The pad is to be interposed between the horseshoe and the hoof.

This pad is characterized by having a central layer or sheet, preferably at least $\frac{1}{8}''$ thick, which extends to the outer edges of the pad and is to receive a rim horseshoe on the turf side. The full pad has a raised central portion on the turf side that fits within the open central portion of the rim horseshoe and is adapted to take up shock along with the horseshoe. The central portion comprises a series of stabilizer bars which rise above the plane of the central layer to approximately the thickness of the horseshoe. Preferably the stabilizer bars run on a line from the toe to the heel. Also preferably the full pad has integrally molded heel shock reducers that fit between the ends of the rim horseshoe and also rise to about the thickness of the horseshoe so that they too take up some of the shock and concussion as the hoof is placed on the ground by the horse.

By a rim horseshoe is meant a horseshoe of conventional or traditional design that fits on the outer edges of the horse's hoof and has an open central portion. While the horseshoe is usually made of metal such as iron or aluminum, it could be of a tough plastic composition in some cases. By the term "full pad" is meant that the pad extends over the entire bottom surface of the hoof, covering the frog.

In a preferred embodiment the full pad of this invention also has a frog pad on the hoof side in the central portion. This frog pad generally has an elongated triangular shape with the base being at the heel and the apex extending into the central portion. The apex usually will be truncated. The frog pad is preferably thicker at the apex end and slopes to a lesser thickness at the base. Its shape and thickness can be not only to protect the frog but also to stimulate it and improve circulation.

The frog pad usually will be integrally molded in the hoof side of the full pad of this invention and can be cut or ground away in toto or in part to the extent it is not desired by the blacksmith. The frog can, however, be mechanically separate from the full pad and attached thereto as desired as with a pressure sensitive adhesive or by mechanical interlocking e.g. in the nature of a "poppet bead" interlock.

In a preferred design the central sheet or layer will be approximately $\frac{1}{4}''$ thick, $5\frac{1}{2}''$ wide times $6''$ long with an approximate $1\frac{1}{4}''$ wide rim about the raised center portion on the hoof side. The raised center portion will comprise a layer of about $\frac{1}{8}''$ thick stabilizer bars thereon, which bars preferably run along a line from the heel to the toe. Preferably there is a transverse cleat on the toe side of the stabilizer bars of the same height and thickness. The bars are spaced in the order of $\frac{3}{8}''$ apart and can themselves be 3/16" to $\frac{1}{2}''$ wide. The heel shock reducers sit on a $\frac{1}{8}''$ thick raised layer, which may be a continuation of the raised central portion, and are themselves also $\frac{1}{8}''$ thick. This gives a pad that is approximately $\frac{1}{2}''$ thick excluding the thickness of the frog pad if one be present.

The full pad is preferably made of a polyurethane foam molded in a closed mold. The overall specific gravity of the pad may vary depending upon the energy absorption desired and will usually be in the range of 0.5 to 1. The pad is made to have a tough outer skin of higher density and a lower density foam core which may have a density in the range of 50 to 80% of the overall density of the pad. The mold may be chilled if desired. The Surface Shore A (ASKER) hardness of the pad is in the range of 50 to 85%. If the surface of the pad is made tougher than this, this is usually at the sacrifice of desired resiliency.

While a polyurethane foam is the preferred composition, other foamable plastic compositions can be used such as natural rubber or neoprene.

The full pad of this invention is designed to be interposed between the horseshoe and the horse's hoof. As made it will have a size larger than the hoof but its composition is such that it can be readily trimmed to fit the hoof.

The full pad of this invention has been tested. In cases where the horse was already injured or lame, it provided relief from further concussion while the injury healed. It has also been used to prevent injuries during racing. Generally, a harder more dense pad is used in this case as compared to a pad that is used to provide relief during healing. The harder the pad, the longer it will last.

Reducing concussion from an impacting horse hoof onto the ground is easier said than done, especially in animals weighing in excess of 900 lbs. The landing force of a horse is usually four to five times its weight. In the past most hoof pads were either hard, such as leather, or soft throughout the entire pad, such as non-formed rubber. If it were hard the pad did not adequately cushion and if it were soft the pad did not last. In the present invention the full pad has a tough durable outer surface and a soft cushioning interior which when combined with the functional frog pad, heel shock reducer, and central stabilizing bars in a combined configuration not heretofore appreciated, yields a full pad of exceptional performance.

THE DRAWING

In the drawing:

FIG. 1 is a view of the turf side of the full pad of this invention;

FIG. 2 is a cross-sectional view of the pad taken along line A—A of FIG. 1; and

FIG. 3 is a view of the hoof side of the pad.

EXAMPLE

The polyurethane foam plastic composition used to make the pads in these examples was sold by Plastic Technology Association, Inc., Farmingdale, N.J., under the designation "Everflex 426". This composition is described in the above U.S. Pat. No. 4,2876,307. It forms a good, tough integral skin microcellular polyurethane elastomer. This plastic was used to make full pads by pour cup casting in accordance with the manufacturer's directions of two specific gravities—0.72, colored green, and 0.65, colored black. The green colored samples gave Shore A surface hardness readings on a tread of 73, on the rim of 71 and on the frog of about 64.

With reference to the drawing, the full pad generally comprises a central layer or sheet 11 approximately ⅛" thick that runs to the edges of the pad. On the turf side of the pad an elliptically-shaped central portion consists of a raised layer 12 approximately ⅛" thick onto which are integrally molded five stabilizer bars 13 and a transverse cleat 14 on the toe side thereof. These are also approximately ⅛" thick so that the total thickness of the pad through the stabilizer bars and cleat is approximately ⅜". The bars and the cleat are approximately 3/16" wide except for the center bar which is ½" wide. They are spaced approximately ⅜" apart. The side walls of the cleat and the bars may be tapered slightly to assist release of dirt. The rim about the raised central portion may be approximately 1¼" wide. The dimensions given are for a pad to fit a standardbred horse. The dimensions can of course be varied as required.

Heel shock reducers 16 are molded integrally with the pad and may be placed on an extension 17 of the ⅛" thick raised central portion, as shown.

Turning to the hoof side shown in FIG. 3, sheet 11 on this side is planar except for the raised frog pad 20 in the central portion. While the full pad of this invention is useful without a frog pad, the integral molding of a frog pad with a full pad is preferred. The frog pad preferably is thicker at its apex 21, e.g. ¼" thick. It tapers to its base 22 to a thickness of ⅛". The frog pad usually will be in the form of a truncated triangle as shown with the base being at the heel and the apex 21 being in the central portion. The frog pad will of course be of a shape and thickness to fit the breed of horse being shod and will usually be designed not only to protect the frog but also to stimulate and increase circulation.

While it is definitely preferred to mold the frog pad integrally with the full pad leaving it to the blacksmith to cut or grind away what is not required, the frog pads can be made separate from the full pad and attached thereto as with a pressure sensitive adhesive or mechanical interlocking if the blacksmith desires to have the use of a frog pad.

The lower density black colored full pad in use on standardbreds lasted about four weeks between shoeing and the higher density green pad lasted about eight weeks under normal conditions of use.

What is claimed is:

1. A horseshoe and pad affixed to a horse's hoof comprising a metal horseshoe having an open central portion and a cushioning full pad interposed between the hoof and the shoe, said full pad being of a molded foamed energy absorbing elastomeric plastic having a tough outer skin on both sides and a more resilient lower density core and being a sheet trimmed to said hoof, said sheet having on the turf side an integral central raised portion with stabilizer bars rising approximately to the height of said metal horseshoe.

2. The shod horse's hoof of claim 1 wherein said full pad has on the hoof side an integral raised frog pad of a shape and thickness sufficient to stimulate the frog of said hoof.

3. The shod horse's hoof of claim 2 wherein said full pad is of a polyurethane foam.

4. A horseshoe full pad of a molded polyurethane foam having a tough outer skin on both sides and a more resilient lower density core, having generally the shape of the bottom of a hoof and being adapted to be trimmed thereto, said full pad comprising:
   a. a planar central layer extending to the outer edges of the pad and adapted to receive a rim horseshoe on the turf side thereof;
   b. a raised central portion on said turf side lying within the open central portion of said rim horseshoe and adapted to take up shock along with said horseshoe, said raised center portion comprising a series of stabilizer bars rising above said central layer to the approximate thickness of said rim horseshoe, said stabilizer bars running on a line from the toe to the heel;
   c. on the turf side, an integrally molded heel shock reducer between the ends of said rim horeshoe and rising to the approximate thickness of said rim horseshoe; and
   d. a frog pad on the hoof side in the central portion, said frog pad having a generally elongated triangle shape with the base thereof being at the heel and the apex extending into the central portion; said polyurethane foam having an overall density in the range of 0.5 to 1 with said core having a density in the range of 50 to 80% of said overall density, and said full pad having a Surface Shore hardness in the range of 60 to 85.

5. A horseshoe full pad of a molded foamed plastic composition having (i) a tough outer skin on both sides and a more resilent lower density core, and (ii) generally the shape of the bottom of a hoof and being adapted to be trimmed thereto, said full pad comprising:
   a. a planar central layer extending to the outer edges of the pad and adapted to receive a rim horseshoe on the turf side thereof;
   b. a raised central portion on said turf side lying within the open central portion of said rim horseshoe and adapted to take up shock along with said horseshoe, said raised center portion comprising a series of stabilizer bars rising above said central layer to the approximate thickness of said rim horseshoe, said stabilizer bars running on a line from the toe to the heel; and
   c. on the turf side an integrally molded heel shock reducer between the ends of said rim horseshoe and rising to the approximate thickness of said rim horseshoe.

6. The full pad of claim 5 having a frog pad on the hoof side in the central portion, said frog pad having a generally elongated triangle shape with the base thereof being at the heel and the apex extending into the central portion.

7. The full pad of claim 6 wherein said full pad is of a urethane foam and has an overall density in the range of 0.5 to 1 with the core having a density in the range of 50 to 80% of said overall density, and said full pad has a surface Shore A hardness in the range of 50 to 85.

8. The full pad of claim 7 wherein (a) said planar central layer is approximately ¼" thick, 5½" wide, and 6" long with an approximate 1¼" wide rim about said raised center portion; (b) said stabilizer bars comprising the raise central portion are approximately ⅛" thick, 3/16" to ½" wide and spaced approximately ⅜" apart, there being at least four of said stabilizer bars and one transverse cleat on the toe side thereof, all of which lie on a raised elliptical-shaped central portion approximately ⅛" thick; (c) said integrally molded heel shock reducer is approximately ⅛" thick and sits on an elevated portion of said center layer approximately ⅛" thick with the heel shock absorbers being approximately ⅛" thick; and (d) said frog pad is approximately ¼" thick at said apex and tapers to approximately ⅛" at said base.

* * * * *